United States Patent [19]

Perlini

[11] Patent Number: 4,591,177
[45] Date of Patent: May 27, 1986

[54] OLEODYNAMIC STEERING CONTROL DEVICE

[76] Inventor: Roberto Perlini, 37047 San Bonifacio-Locara (Verona), Italy

[21] Appl. No.: 596,051

[22] Filed: Apr. 2, 1984

[30] Foreign Application Priority Data

Jan. 19, 1984 [IT] Italy ................. 67052 A/84

[51] Int. Cl.[4] ............................................. B62D 7/00
[52] U.S. Cl. .......................................... 280/91; 91/399; 91/437; 180/140
[58] Field of Search ............. 280/91, 98, 99, 103; 180/131, 140, 79, 143; 91/399, 437; 60/589

[56] References Cited

U.S. PATENT DOCUMENTS

| | | | |
|---|---|---|---|
| 2,274,821 | 3/1942 | Bloxsom | 280/91 |
| 3,185,245 | 5/1965 | Hoyt | 280/91 |
| 3,202,238 | 8/1965 | Strader | 280/91 |
| 3,255,840 | 6/1966 | Tangen | 280/91 |
| 3,800,541 | 4/1974 | Sinjelar et al. | 60/589 |
| 4,105,086 | 8/1978 | Ishii et al. | 280/91 |

Primary Examiner—Richard A. Bertsch
Attorney, Agent, or Firm—Harding, Earley, Follmer & Frailey

[57] ABSTRACT

An oleodynamic steering control device for vehicles having a straight traveling stabilizer, the device comprising a cylindrical member containing a reciprocatable or rotatable element connected to the main steering system and operative to generate a fluid pressure which is transmitted to a steering actuator on an axle to be steered. The device provides a fluid bypass to a reservoir for a certain range relative to the position corresponding to the straight traveling condition of the vehicle. This relieves the pressures generated by small deviations from straight traveling, which occur at relatively high speed, and thus they are not transmitted and multiplied on the steered axle which is thus stabilized, affording greater traveling safety.

11 Claims, 13 Drawing Figures

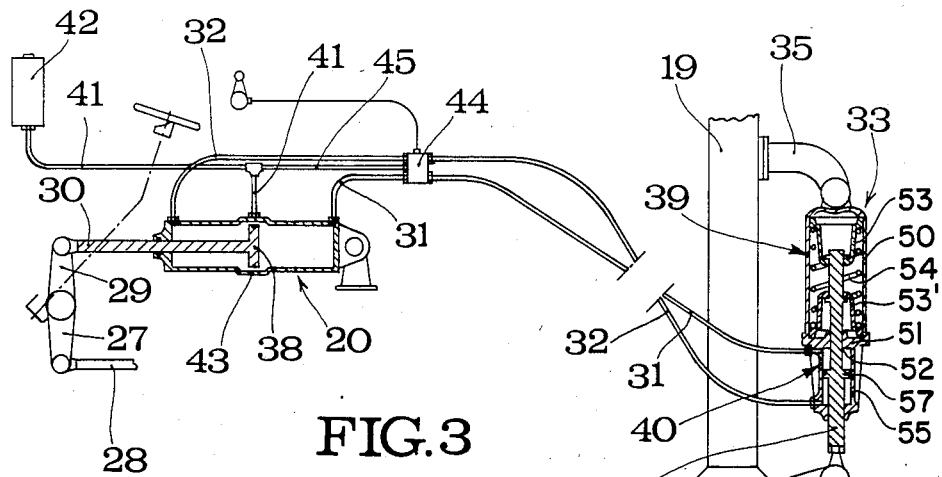
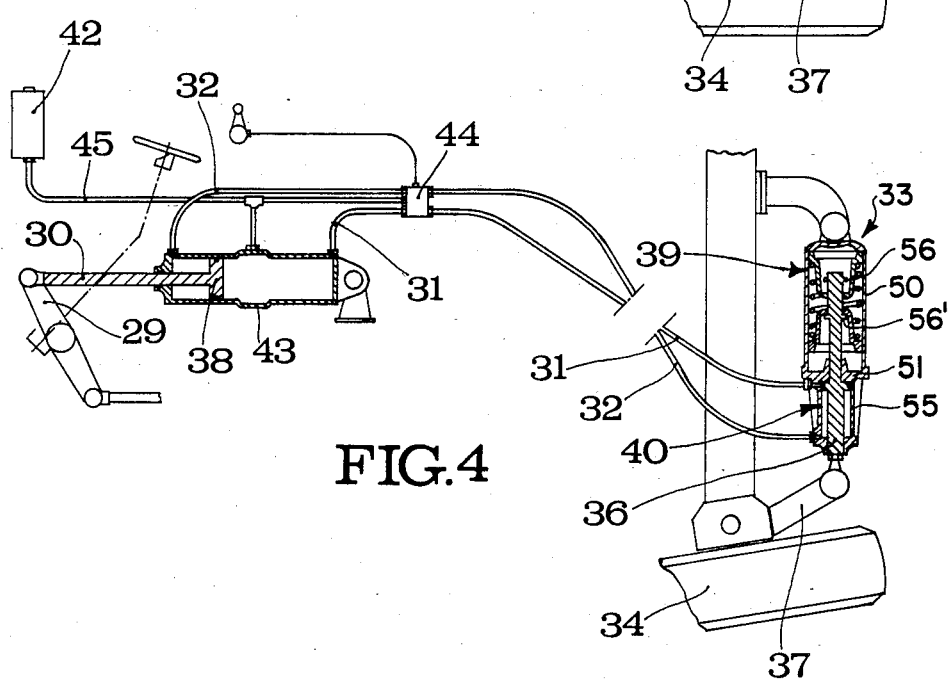

4,591,177

OLEODYNAMIC STEERING CONTROL DEVICE

BACKGROUND OF THE INVENTION

This invention relates to an oleodynamic control device for steering wheels of vehicles provided with straight traveling stabilizer. More particularly, the invention relates to an oleodynamic control device for steering rear wheels acted upon by a straight traveling stabilizer and a hydraulic steering actuator through an articulated arm.

In some patents rear wheel steering systems are described, particularly for industrial vehicles, in which such pivotable wheels are subjected both to the action of a straight traveling stabilizer and a hydraulic actuator cylinder which exerts forces for modifying the straight traveling condition imposed by the stabilizer to thus determine steering of the wheels.

Swiss Pat. No. 396,652 relates to such a system which comprises a double-acting hydraulic cylinder which through a double fluid conduit controls a steering actuator cylinder. In a straight traveling situation the piston of the control cylinder occupies a position exactly in the center of the cylinder and is connected to the steering system of the vehicle so that each variation from straight traveling causes the piston to shift from said center position, which causes actuation of the actuator cylinder and steering of the wheels. As in such a system the hydraulic circuit which communicates with the control cylinder and the actuator cylinder is always under pressure, there being even provided accumulator means for maintaining a certain value of such pressure, it happens that the least variation of the main steering system from the straight traveling attitude causes steering of the rear wheels. The same effect occurs when there is some play in the connection between the piston of the control cylinder and the main steering system or when use and wear of the piston cause fluid to leak into said cylinder or when there is an imperfect setting of the mechanical members involved in the transmission of movement to the piston. In all these cases, which are practically unavoidable, the system in question exhibits the serious disadvantage of causing undesired steering of the rear wheels with the obvious consequences of side skidding and the risk of coming off the road. This is a serious drawback considering that there are always small oscillations in the main steering system when the vehicle is running at high speed so that in this case undesired steering of the rear wheels is dangerous.

Another system for steering pivotable wheels with straight traveling stabilizer and hydraulic actuator is described in Italian Patent Application No. 68427-A/81 filed Nov. 5, 1981 by the same Applicant. Although this system does not include accumulator means for maintaining a high pressure in the hydraulic circuit, as described in Swiss Pat. No. 396,652, it is open to the same type of criticism as its control cylinder also causes undesired steering of the wheels in the situation outlined above.

It is therefore an object of the present invention to eliminate the disadvantages of the known systems described above and to provide an oleodynamic control device for steering pivotable wheels subject to the action of a straight traveling stabilizer, which will ensure straight traveling stabilization of such wheels even during small steering movements of the main steering system and will also ensure stabilization when play develops in the connection between the control member and the main steering system.

SUMMARY OF THE INVENTION

The above and other objects and advantages of the invention, which will become apparent from the following description, are achieved by an oleodynamic control device for steering pivotable wheels of motor vehicles provided with an automatic straight traveling stabilizer and an oleodynamic steering actuator connected by a double hydraulic circuit to the oleodynamic control device which is constituted by a member having a cylindrical geometry and a chamber of variable volume for slidably receiving a movable wall element which in a straight traveling attitude occupies an intermediate by-pass position in said member and is actuated hydraulically by changes in the traveling direction of the vehicle, characterized in that in said by-pass position there is a by-pass of the fluid to a reservoir, with relief hydraulic pressure within the control device, for any movement of said movable element within a selected range relative to the center position.

BRIEF DESCRIPTION OF THE DRAWINGS

FIGS. 3 and 4 schematically illustrate the device of FIGS. 1 and 2 in two different positions of operation;

DESCRIPTION OF PREFERRED EMBODIMENTS

Figure 1:
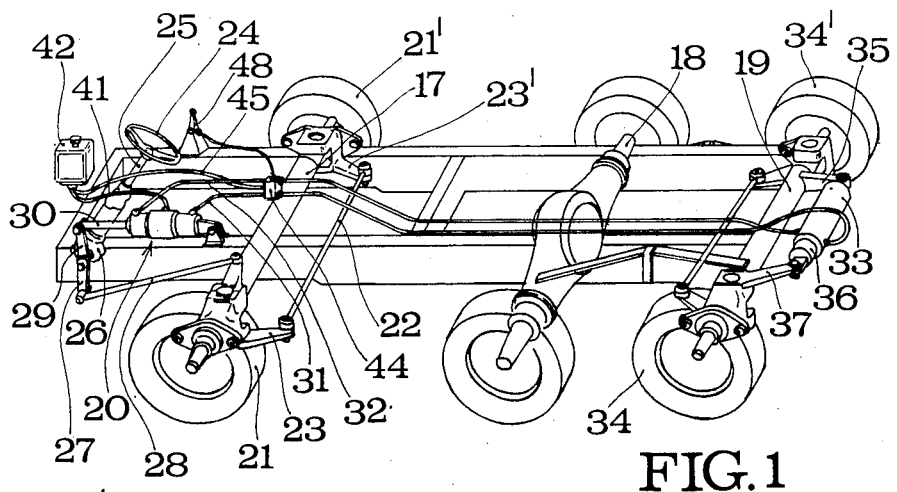
FIG. 1 is a schematic perspective view of a steering system incorporating an oleodynamic steering control device according to the invention in the case of a three-axle vehicle.

FIG. 1 schematically shows the steering system of a three-axle vehicle, typically an industrial vehicle, incorporating a cylindrical oleodynamic steering control device 20 according to the invention. Pivotally mounted on a front axle 17 are the steerable running wheels 21, 21' which are connected to each other by a tranverse rod 22 and articulated arms 23, 23' and controlled by a steering wheel 24 through a steering column 25, steering gear box 26, steering control arm 27 and longitudinal rod 28 as is known in the art. Pivotally connected to steering control arm 27 is another arm 29 which in turn is pivotally connected to a rod 30 of a piston 38 (FIG. 3) slidable within the cylinder 20 which constitutes the oleodynamic steering control device according to the invention and which will be described in detail hereinafter. From control cylinder 20, which is double-acting, extend two conduits 31, 32 which conduct the fluid from cylinder 20 to a rear wheel stabilizing device 33 which is shown in detail in FIGS. 3 and 4 and described in the aforementioned Italian Patent Application No. 68427-A/81 in the name of the same Applicant. Device 33 incorporates an automatic straight traveling stabilizer 39 for rear wheels 34, 34' and an oleodynamic shifting actuator 40 capable of steering wheels 34, 34' which are pivotally mounted on an axle 19. In fact, device 33 is pivotally mounted on a bracket 35 secured to the housing for axle 19 and a piston rod 36 projects therefrom which is articulated to an arm 37 acting on the wheels 34, 34'. On the other hand, the wheels of the intermediate drive axle 18 are fixed. In such a vehicle, steering of wheels 34, 34' is controlled by device 20 which is responsive to variations of attitude of steerable running wheels 21, 21'.

Figure 2:
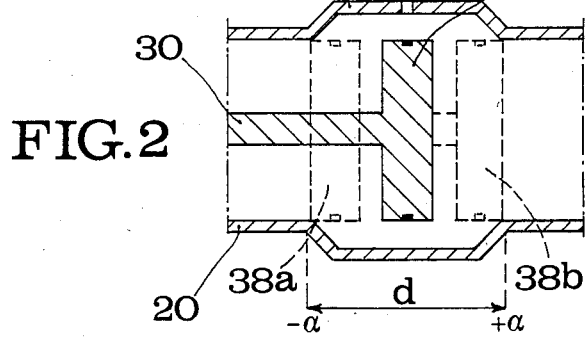
FIG. 2 is an enlarged axial section of a portion of the control device of the invention in a first embodiment.

Considering also FIGS. 2 and 3, which latter Figure schematically illustrates the steering control device 20 connected to device 33, it will be seen that when the vehicle is in a straight traveling attitude, piston 38 is in a position corresponding to the center line of cylinder 20.

When the main steering system of the vehicle firmly maintains the straight traveling attitude, piston 38 of control cylinder 20 remains in the intermediate position shown, so that no fluid pressure is generated in conduits 31 and 32. The device 33 consists of a stabilizer 39 or "permanent elastic energy loading unit" which applies to the 34, 34' of axle 19 stabilizing forces greater than those of the external forces acting on the wheels so that the wheels will maintain their straight traveling attitude until the other constitutent of device 33, i.e. the shifting actuator 40, is set into operation. Shifting or steering actuator 40 constitutes a double-acting hydraulic cylinder connected through conduits 31 and 32 to control device 20.

In the preferred embodiment, the stabilizer 39 and the shifting actuator 40 are constructed as a single member 33, as shown in FIGS. 3 and 4. The stabilizer 39 consists of a hollow housing 50 having an inner transverse wall 51 provided with a central hole 52. A pair of axially spaced, hollow, cup-shaped elements 53, 53' are accommodated in the housing 50 and are urged against the longitudinally spaced end walls of the housing by a helical spring 54. Disposed adjacent to the housing 50, externally of the inner end wall 51 thereof, is a hydraulic cylinder 55, which constitutes the shifting actuator 40. The piston rod 36 extends through the hydraulic cylinder 55 and through the hole 52 in wall 51 into the housing 50. Disposed on the portion of the rod 36 received in the housing 50 is a pair of spaced projections 56, 56', which function to react against the hollow elements 53, 53'. Mounted on the portion of the rod 36 extending through cylinder 55 is an annular projection 57, which constitutes the piston of cylinder 55. The outer end of rod 36 projects from cylinder 55 and is articulated to the arm 37 acting on the wheels 34, 34'.

When control device 20 is actuated, i.e. when fluid under pressure is fed to the shifting actuator 40 through conduits 31 or 32, it exerts on the wheels 34, 34' forces that are greater than those exerted by the stabilizer 39 so that the wheels 34, 34' can be steered. As mentioned above, in the situation of FIGS. 2 and 3 no fluid under pressure is fed to actuator 40 so that there is no steering of wheels 34, 34'.

At the center line of the control cylinder 20 according to the invention there is provided a conduit 41 which provides a by-pass for the fluid to a reservoir 42 indicated schematically. Further, control cylinder 20 has an intermediate portion 43 of increased diameter, wherein the piston 38 is no longer sealingly guided, but permits the fluid to flow into by-pass conduit 41 and discharge into reservoir 42.

According to this basic feature of the invention, shown in detail in FIG. 2, a longitudinal range d is formed in the middle of control cylinder 20, in which piston 38 may pass from a position 38a to a position 38b in a stroke that does not produce any fluid pressure because of the by-pass to the reservoir. Consequently, small variations of the traveling attitude of the main steering system, which result in shifting of the piston within said range d of the cylinder 20, do not produce any steering of wheels 34, 34' pivotally mounted on axle 19.

On the other hand, FIG. 4 illustrates a situation corresponding to actual steering of the front steerable wheels, which through rotation of arm 29 results in a stroke of piston 38 beyond the enlarged cylinder portion 43. This induces a fluid pressure through conduit 32 and consequent actuation of steering actuator 40 whose rod 36 articulated to arm 37 sets the wheels 34, 34' in a curved path attitude by overcoming the resilient reaction of stabilizer 39.

In the described steering system advantageously a by-pass valve 44 may be associated with the control device 20 according to the invention, with this by-pass valve connected to reservoir 42 through a conduit 45. This valve, which is known per se, is shown in cross section in FIGS. 11 and 12.

Figures 11, 12:
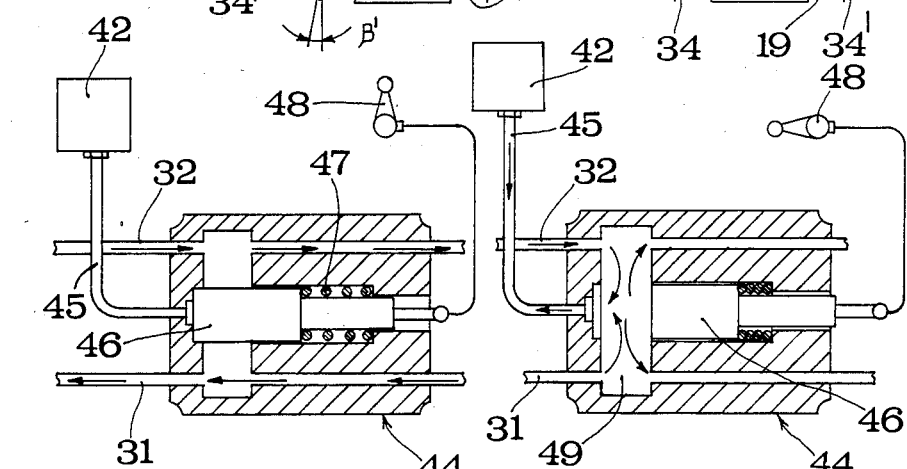
FIGS. 11 and 12 illustrate in section two different arrangements of a by-pass valve which can be associated with the device of the invention.

In the position of operation shown in FIG. 11, piston 46 of valve 44, which is biased by a spring 47, closes conduit 45 so that the fluid can flow through conduits 31 and 32 to activate shifting actuator 40 as a function of the position of the piston in control cylinder 20. On the other hand, FIG. 12 shows a retracted position of piston 46, which may be obtained by means of a hand control member 48 placed, for example, near the driver in the driver's cab as shown in FIG. 1. In the position shown in FIG. 12, the fluid is by-passed through a by-pass chamber 49 to reservoir 42 so that pressure on the actuator 40 is released and the wheels of axle 19 are kept in a fixed position independently of the position of operation of the piston in control cylinder 20. The usefulness of this arrangement will be discussed hereinafter.

Figure 5:
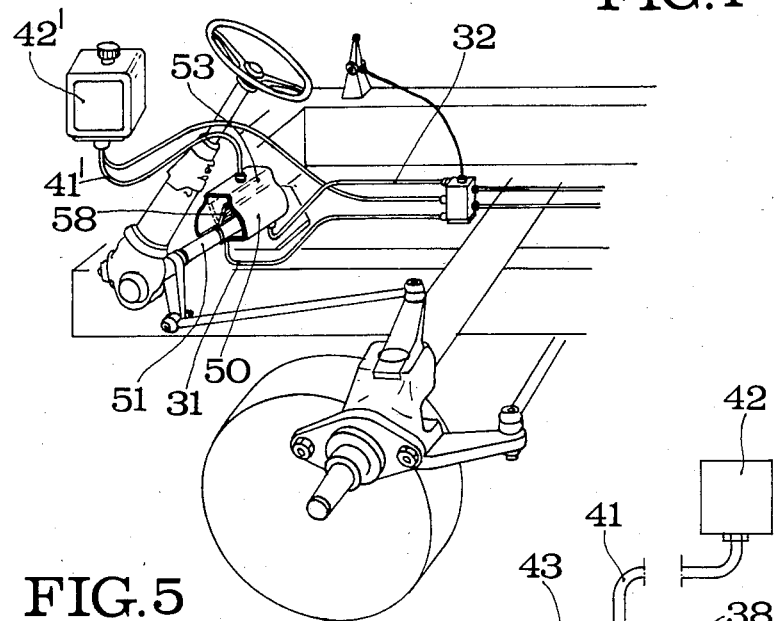
FIG. 5 schematically illustrates, partly in section, the front portion of a vehicle with a second embodiment of the device of the invention.

FIG. 5 shows the front portion of a vehicle with a second embodiment of the steering control device according to the invention. In this case the control device is a semicylinder 50 in the interior of which a rotatably movable element or blade 58 is accommodated, this element being keyed to a rotatable shaft 51 which is set into rotation by the changes in the straight traveling attitude of the main steering system, the component parts of which will not be repeated here as they are identical to those of FIG. 1.

Blade 58 is mounted for sealingly sliding along the walls of semicylinder 50 which, however, is provided with an enlarged portion 53 around the center line of the semicylinder, which permits the fluid to flow into by-pass conduit 41' leading to reservoir 42'. In the straight traveling attitude of the steerable wheels, blade 58 is in an exactly vertical position and therefore permits the fluid to flow into the reservoir; the same may happen in the entire range around the center line in which the blade still faces the enlarged portion 53, similarly to what has been described above with regard to the enlarged portion 43 of cylinder 20.

Figure 6:
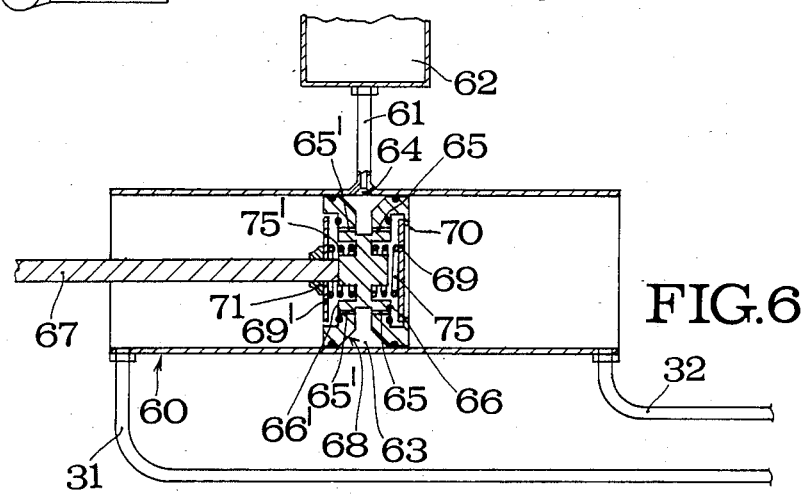
FIGS. 6 and 7 illustrate in axial section a third embodiment of the device of the invention in two different positions of operation.
Figure 7:
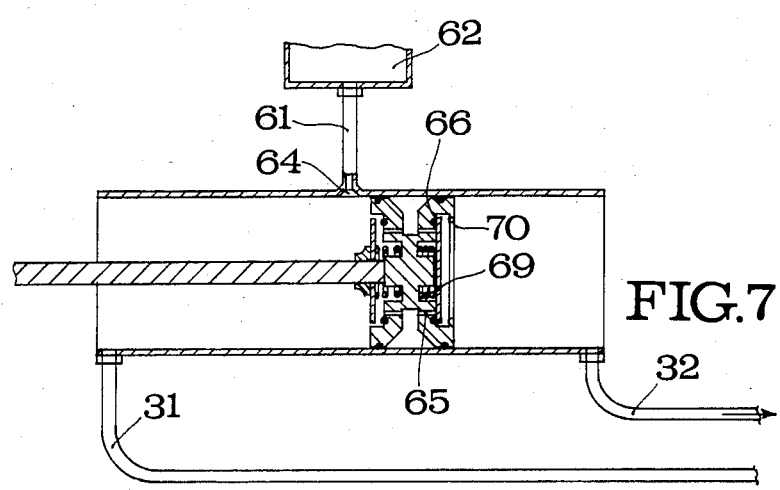

FIGS. 6 and 7 illustrate a third embodiment of the oleodynamic steering control device according to the invention in two different positions of operation. Here the control device has the form of a double-acting cylinder 60 with a reciprocable element or piston 68. Provided along the centre line of cylinder 60 is a flow port 64 which through a by-pass conduit 61 leads to a reservoir 62 which is only partially shown. A funnel-shaped circumferential groove 63 is provided in piston 68 so as to form an annular chamber into which the fluid may flow through holes 65, 65' which communicate said annular chamber with opposed surfaces 66, 66' of the piston. Two coil springs 75, 75' are aranged coaxially to a piston rod 67 and carry a pair of caps 69, 69' which in the situation of operation shown in FIG. 6 are urged one against a stop ring 70 formed integrally with piston 68 and the other against a foot 71 firmly secured to piston rod 67.

In FIG. 6 piston 68 occupies a position in the center line of cylinder 60, which corresponds to the straight traveling attitude of the main steering system. In this position the fluid can flow through apertures 65, 65' and annular chamber 63 into the port 64 and from there into conduit 61 and reservoir 62, providing the by-pass to the reservoir. The by-pass condition is also maintained over a certain range in the vicinity of the center line as the piston 68 may effect a certain stroke before the caps 69, 69' are urged by the fluid pressure in the cylinder against one of the surfaces 66, 66' of the piston and close the holes 65, 65' which permit the fluid to be by-passed to reservoir 62.

FIG. 7 shows the position assumed by the system when the steerable wheels are actually steered. The stroke of piston 68 to the right in this case causes the cap 69 to be urged against surface 66 and the holes 65 to be closed. In this situation annular chamber 63 no longer communicates with port 64 and conduit 61 so that the system is no longer by-passed to the reservoir 62. Therefore, the fluid under pressure is fed through conduit 32 to the shifting actuator which causes steering of the wheels pivotally mounted on the rear axle.

Figure 8:
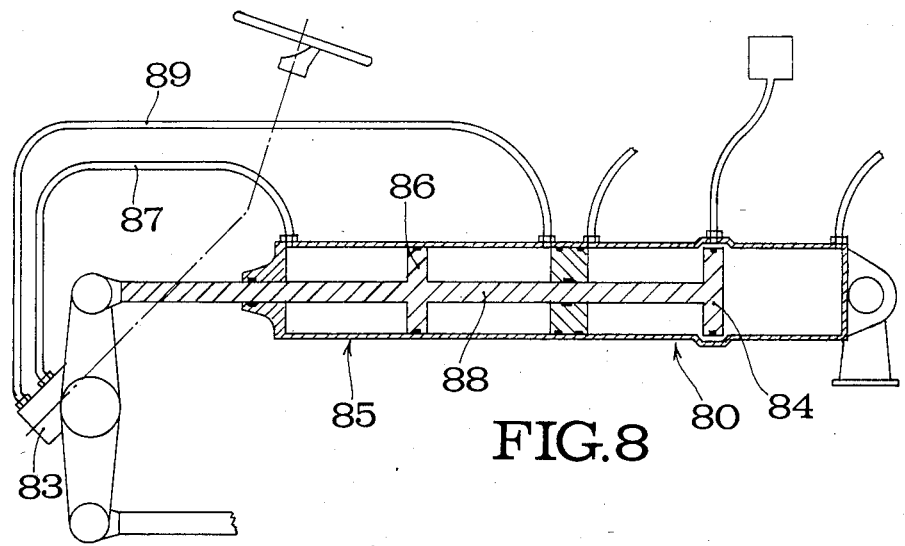
FIG. 8 illustrates in axial section a fourth embodiment of the device of the invention.

FIG. 8 shows a fourth embodiment of the oleodynamic steering control device according to the invention. This embodiment includes a control cylinder 80 and piston 84 similar to that of FIGS. 1 to 4, but having an integral power steering device 85 in the form of a second, coaxially extending cylinder with a piston 86 carried by the piston rod 88 extending from the cylinder 80. Fluid under pressure is fed to the power steering device 85 from a steering gear box 83 through lines 87, 89 to provide the power for shifting piston 86 and thus piston 84 of cylinder 80 to increase the steering forces transmitted manually by the driver to the system.

Obviously a power steering device may be associated with any of the described embodiments of the oleodynamic steering control device and with any equivalent embodiments.

Figures 9, 10:
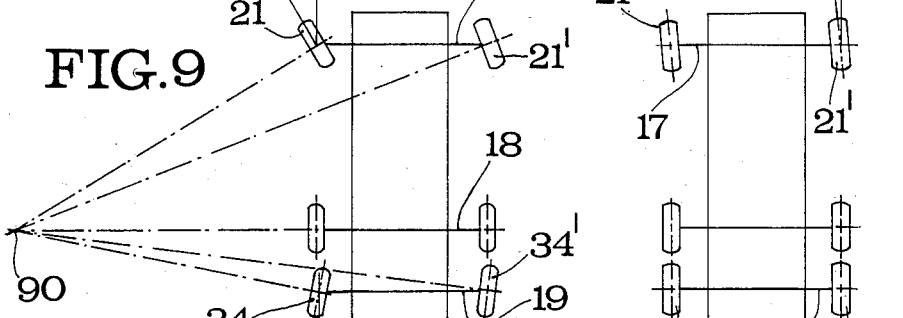
FIGS. 9 and 10 schematically illustrate in plan view two steering attitudes of a three-axle vehicle incorporating the device of the invention.

By referring to FIGS. 9 and 10 the operation of the steering system incorporating the oleodynamic steering control device according to the invention may be summarized.

FIG. 9 schematically shows a vehicle with three axles 17, 18 and 19 of the type shown in FIG. 1. To obtain correct turning, i.e. without skidding, the projected extensions of the axes of rotation (indicated by dash-and-dot lines) of the individual wheels must meet at the swing center 90. Therefore, the wheels 34, 34' pivotally mounted on axle 19 must rotate through an angle $\beta'$ which is a function of an angle $\beta$ defined by the rotation of steerable wheels 21, 21'.

However when, as shown in FIG. 10, wheels 21, 21' rotate through an angle $\alpha$ which is much smaller than $\beta$, the system owing to the characteristics of the steering control device according to the invention does not cause steering of rear wheels 34, 34'. Considering also FIG. 2 again, it will be understood that the value of the angle $\alpha$, for which there is no steering of the rear wheels, depends upon the width of the by-pass range d as over this entire range the pressure on the shifting actuator of the rear wheels is zero.

The advantage of the device according to the invention therefore consists in that it prevents minor corrections of the traveling path, which occur in straight traveling, and minor shiftings in the steering controls connections, from being multiplied by the steering response of the controlled axle or axles, resulting in instability of the vehicle or a risk of it suddenly leaving the path that it the following.

The range within which the state of straight traveling of the wheels 34, 34' continues can be measured in degrees of steering where the value of the angle is a function of the width of the by-pass range i.e. $60 = f(d)$.

It is evident that by-passing and thus excluding the system, by manual or automatic adjustment, as the case may be, will permit travel with the wheels 34, 34' stabilized for straight traveling for any condition of the ground, i.e. snow, ice, etc.

Figure 13:
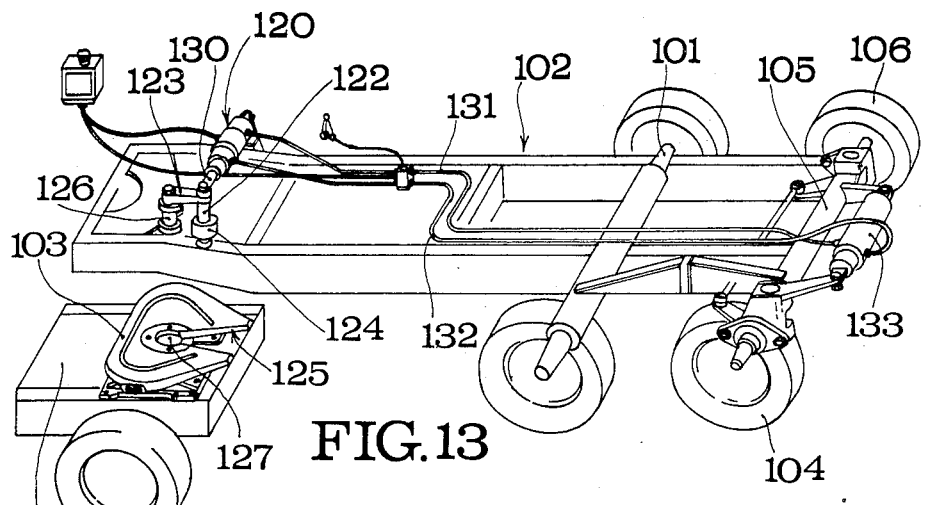
FIG. 13 schematically illustrates in a perspective view the steering device incorporating the device of the invention in the case of a semitrailer with fifth wheel steering.

The oleodynamic steering control device according to the invention may also be used for steering the axle or axles of a semi-trailer as shown in FIG. 13. A portion of the tractor vehicle here is indicated by 100 and comprises a fifth wheel attachment 103. Semitrailer 102 includes a fixed wheel axle 101 and an axle 105 with pivotally mounted rear wheels 104, 106 the steering of which is obtained by a wheel stabilizing device 133 in a manner similar to the device 33 of FIG. 1.

The shifting actuator contained in the device 133 is connected through a double hydraulic circuit 131, 132 to an oleodynamic steering control device 120 similar to the previously described device 20 (or 50 or 60). Piston rod 130 projecting from device 120 is pivotally connected to a depending rod 122 having a cylindrically enlarged portion 124 engaging within a tapered recess 125 in fifth wheel attachment 103. Further, an arm 123 is pivotally connected at one end to the rod 122 and at the other end to a depending rod 126 inserted in a center hole 127 in fifth wheel attachment 103. Thus, steering of the tractor vehicle 100 causes a reciprocating movement of rod 130. More particularly, the walls of recess 125, which always engage cylindrically enlarged portion 124, shift the rod 122 about a fulcrum located on rod 126, and thus shift piston rod 130 which is pivotally connected to rod 122.

Also in this embodiment the steering control device 120 feeds fluid under pressure to the wheel stabilizing device 133 only for strokes of the piston (not shown) mounted on rod 130, which go beyond the by-pass range described previously.

Thus, the following conditions of operation may be encountered:

(a) driving in a curve;
(b) driving along a straight path;

(b') driving (along a straight path) with slight variations;

(c) driving with the steering control device made inoperative;

(d) breakdown of the hydraulic circuit (oleodynamic system);

(a) Driving in a curve (FIGS. 4, 7, 9)

Under these conditions the device ensures movement on predetermined and controlled paths.

In fact, the steering action is introduced by the main steering system of the vehicle or by the fifth wheel attachment for semitrailers or trailers, depending on the side of steering, into the right-hand or left-hand control circuit which can be combined in one double-acting control cylinder. This circuit, to the extent determined by the main steering system, transmits the oleodynamic action to the shifting actuator 40 which, overcoming the effect of the permanent elastic energy loading unit 39, causes progressive, predetermined and controlled shifting of the wheels 34, 34', 104, 106 by the angular values predetermined by the system as a function of the steering radius or the swing center (FIG. 9).

When the action of the control forces exerted by the pressure of the oleodynamic circuit acting on the actuator 40 has ceased, the stabilizing forces of the permanent elastic energy loading unit 39 in the wheel stabilizing device return the assembly to the straight traveling attitude, i.e. at the end of the curve the condition of the wheels stabilized for straight driving is reset.

(b) Driving along a straight path (FIGS. 2, 3, 6, 8)

As under this condition the action of the main steering system is missing, the following takes place:

the double control circuit 31, 32 or 131, 132 is in by-pass and thus discharges the fluid to the reservoir 42, 42';

the oleodynamic pressure on the shifting actuator 40 is zero;

the permanent elastic energy loading unit 39 applies to the wheels pivotally mounted on the axles 19, 105 stabilizing forces which in terms of absolute value are higher than the external forces and keeps the wheels in the condition of wheels stabilized for straight traveling.

(b') Driving (along a straight path) with slight variations (FIGS. 2 and 10)

In case of small variations of steering due to correction of the position of the driving wheel with the vehicle running at a considerable speed, steering is effected only on the steerable running wheels and not on the wheels of the controlled rear axle so as to avoid the risk of skidding. The practical result of this concept is that for small degrees ($\alpha$) of the steering angle (FIG. 10) of the steerable running wheels, the wheels of the controlled axle are not steered but maintain their straight attitude.

The condition just described applies to the range $$-\alpha \longleftarrow 0 \longleftarrow +\alpha$$

(c) Driving with the steering control device made inoperative (FIG. 12)

For this case an example of making the device inoperative by means of manually operable by-pass valve 44 has been described and illustrated.

By actuation of control member 48, which may be operated manually or automatically and be of any desired construction, the fluid from circuits 31 and 32 is by-passed to reservoir 42 whereby the pressure is neutralized and the condition of the previous cases of a fixed axle with wheels stabilized for straight traveling is re-established.

The possibility of making the device inoperative may prove particularly useful in certain conditions of the ground such as roads covered with snow, ice, etc. or for particular maneuvers.

(d) Breakdown of the oleodynamic system

In case of breakdown of one or both control circuits 31 and 32 which permit steering, the pressure in the circuit is neutralized so that the condition of the wheels stabilized for straight traveling is maintained by the permanent elastic energy loading unit 39.

Although some preferred embodiments of the invention have thus been described in detail and illustrated in the accompanying drawings, it is to be understood that the invention is not limited to these precise embodiments and that numerous changes and modifications obvious to one skilled in the art may be made therein without departing from the scope of the invention as defined by the appended claims.

I claim:

1. An oleodynamic steering control device for steering pivotable wheels of motor vehicles provided with an automatic straight traveling stabilizer and an oleodynamic steering actuator connected by a double hydraulic circuit to said control device, said control device comprising a substantially cylindrical member and a chamber of variable volume within said member for slidably receiving a piston, said piston occupying a center position in said substantially cylindrical member in the straight traveling attitude and being responsive to changes in the traveling direction of the vehicle, characterized by a fluid by-pass to a reservoir in said center position and in the vicinity thereof adapted to relieve fluid pressure for any movement of said piston in said center position and said vicinity thereof, said by-pass comprising an annular chamber provided at the periphery of said piston and communicating with opposite surfaces of said piston through ports provided therein and adapted to be closed by caps biased by springs axially supported by said piston and a fluid flow port disposed adjacent a center line of said substantially cylindrical member and communicating with a conduit leading to said reservoir.

2. An oleodynamic steering control device as claimed in claim 1, wherein axial movement of said caps is limited by stops provided on said piston.

3. An oleodynamic steering control device for steering pivotable wheels of motor vehicles provided with an automatic straight traveling stabilizer and an oleodynamic steering actuator connected by a double hydraulic circuit to said control device, said control device comprising a substantially cylindrical member and a chamber of variable volume within said member for slidably receiving a movable wall element, said movable wall element occupying a center position in said substantially cylindrical member in the straight traveling attitude and being responsive to changes in the traveling direction of the vehicle, the improvement wherein said movable wall element is constituted by a blade rotatable by conventional steering members of said motor vehicle, and wherein a fluid by-pass to a reservoir is located in said center position and in the vicinity thereof and is adapted to relieve fluid pressure for any movement of said rotatable blade in said center position and said vicinity thereof, said by-pass comprising a portion of increased diameter provided on said substantially cylindrical member along a center line thereof to define an enlarged chamber provided with a port communicating with a conduit leading to said reservoir.

4. An oleodynamic steering control device for steerable wheels of a motor vehicle provided with an automatic straight traveling stabilizer and an oleodynamic steering actuator connected by a hydraulic circuit to said control device, said control device comprising a substantially cylindrical member having a hydraulically actuated movable wall element disposed slidably therein, said wall element being movable in response to changes in the traveling direction of the vehicle, characterized by
 (a) a fluid by-pass chamber disposed within the substantially cylindrical member,
 (b) a reservoir,
 (c) a fluid by-pass conduit connecting said fluid by-pass chamber to the reservoir and
 (d) means locating the movable wall element adjacent the by-pass conduit when the motor vehicle is in the straight traveling attitude,
 (e) said by-pass chamber and by-pass conduit being operative to relieve hydraulic pressure within the substantially cylindrical member for any movement of said movable wall element within a selected range relative to said by-pass conduit.

5. An oleodynamic steering control device as claimed in claim 4, wherein said movable wall element comprises a reciprocatory piston and said by-pass chamber comprises an intermediate portion of said substantially cylindrical member of increased diameter, said intermediate portion having a fluid flow port communicating with the by-pass conduit leading to said reservoir.

6. An oleodynamic steering control device as claimed in claim 4, wherein the movable wall element comprises a reciprocatory piston, an annular chamber is provided at the periphery of said piston and communicates with opposite surfaces of said piston through ports provided therein and adapted to be closed by caps biased by springs supported by said piston, and a fluid flow port is located adjacent a center line of said cylindrical member and communicates with said by-pass conduit.

7. An oleodynamic steering control device as claimed in claim 4, wherein said movable wall element is constituted by a blade rotatable by conventional steering members of said motor vehicle and a portion of increased diameter is provided on said substantially cylindrical member along a center line thereof to define a by-pass chamber, said by-pass chamber having a port communicating with said by-pass conduit.

8. An oleodynamic steering control device as claimed in claim 4, wherein said movable wall element comprises a reciprocatory piston, further including
 (a) a power steering device disposed adjacent to and coaxially with said substantially cylindrical member,
 (b) said power steering device including a reciprocatory piston, and
 (c) a common piston rod connecting the piston of said power steering device to the piston of said substantially cylindrical member.

9. An oleodynamic steering control device as claimed in claim 8, wherein said power steering device comprises a double-acting hydraulic cylinder formed integrally with said substantially cylindrical member.

10. An oleodynamic steering control device as claimed in claim 4, wherein said automatic straight traveling stabilizer and said oleodynamic steering actuator are constructed as a single member constituted by
 (a) a housing pivotally mounted on a bracket secured to an axle housing,
 (b) a hydraulic cylinder disposed adjacent to and coaxially with said housing,
 (c) a rod disposed slidably within the hydraulic cylinder, said rod having an inner end portion extending into the housing and having an outer end portion projecting from the hydraulic cylinder and connected to said steerable wheels,
 (d) a piston disposed on the rod internally of the hydraulic cylinder,
 (e) a pair of axially spaced hollow elements disposed slidably on the rod internally of the housing,
 (f) elastic means located internally of said housing to act against said hollow elements and
 (g) spaced projections disposed on the rod internally of the housing.

11. An oleodynamic steering control device as claimed in claim 10, wherein said elastic means is a helical spring disposed intermediate of the spaced hollow elements.

* * * * *